United States Patent
Ichihara (10) Patent No.: US 11,072,417 B2
(45) Date of Patent: Jul. 27, 2021

(54) UNMANNED AIRCRAFT

(71) Applicant: PRODRONE CO., LTD., Nagoya (JP)

(72) Inventor: Kazuo Ichihara, Nagoya (JP)

(73) Assignee: PRODRONE CO., LTD, Nagoya (JP)

(*) Notice: Subject to any disclaimer, the term of this patent is extended or adjusted under 35 U.S.C. 154(b) by 180 days.

(21) Appl. No.: 16/303,969

(22) PCT Filed: Nov. 30, 2016

(86) PCT No.: PCT/JP2016/005032
§ 371 (c)(1),
(2) Date: Nov. 21, 2018

(87) PCT Pub. No.: WO2017/203552
PCT Pub. Date: Nov. 30, 2017

(65) Prior Publication Data
US 2020/0057454 A1 Feb. 20, 2020

(30) Foreign Application Priority Data

May 26, 2016 (JP) .............................. JP2016-105579

(51) Int. Cl.
*G05D 1/10* (2006.01)
*B64C 39/02* (2006.01)
(Continued)

(52) U.S. Cl.
CPC ............ *B64C 13/20* (2013.01); *B64C 39/024* (2013.01); *B64D 47/08* (2013.01); *G05D 1/101* (2013.01);
(Continued)

(58) Field of Classification Search
CPC ............ B64C 39/024; B64C 2201/127; B64C 2201/027; B64C 2201/145;
(Continued)

(56) References Cited

U.S. PATENT DOCUMENTS

2014/0288813 A1* 9/2014 Levien .................. F41G 7/2206
701/301
2016/0054354 A1* 2/2016 Keal ........................ G01P 15/16
702/141
(Continued)

FOREIGN PATENT DOCUMENTS

JP 2004359071 A 12/2004
JP 2010079326 A 4/2010
(Continued)

OTHER PUBLICATIONS

International Search Report (ISR) dated Dec. 20, 2016 issued in International Application No. PCT/JP2016/005032.
(Continued)

*Primary Examiner* — Peter D Nolan
*Assistant Examiner* — Demetra R Smith-Stewart
(74) *Attorney, Agent, or Firm* — Holtz, Holtz & Volek PC (57) ABSTRACT

In order to provide an unmanned aircraft capable of minimizing damage due to a crash caused by malfunction or the like during flight, a flight route is set on map information including a fall avoidance area, control is performed such that the aircraft flies on a set flight route, and information at each position during flight on the flight route is acquired in relation to the map information in real time to determine whether or not the aircraft is approaching the fall avoidance area. In a case where it is determined that the aircraft is approaching the fall avoidance area, control is performed so as to increase a flight speed.

6 Claims, 9 Drawing Sheets

(51) Int. Cl.
*B64D 47/08* (2006.01)
*B64C 13/20* (2006.01)

(52) U.S. Cl.
CPC ........ *G05D 1/106* (2019.05); *B64C 2201/027* (2013.01); *B64C 2201/042* (2013.01); *B64C 2201/108* (2013.01); *B64C 2201/126* (2013.01); *B64C 2201/127* (2013.01); *B64C 2201/145* (2013.01)

(58) Field of Classification Search
CPC ........ B64C 2201/042; B64C 2201/126; G05D 1/101; B64D 47/08
See application file for complete search history.

(56) References Cited

U.S. PATENT DOCUMENTS

| | | | |
|---|---|---|---|
| 2016/0238481 A1* | 8/2016 | Brandon | G01M 9/08 |
| 2016/0253907 A1* | 9/2016 | Taveira | G07B 15/00 |
| | | | 701/3 |
| 2016/0327389 A1* | 11/2016 | Uzunovic | G01C 17/38 |
| 2017/0106976 A1* | 4/2017 | Kuhara | B64C 39/024 |
| 2017/0337826 A1* | 11/2017 | Moran | G05D 1/0088 |

FOREIGN PATENT DOCUMENTS

| JP | 2014199548 A | 10/2014 |
|---|---|---|
| JP | 6182343 B2 * | 8/2017 |

OTHER PUBLICATIONS

Written Opinion dated Dec. 20, 2016 issued in International Application No. PCT/JP2016/005032.

\* cited by examiner

FALL AVOIDANCE AREA

UNMANNED AIRCRAFT

TECHNICAL FIELD

The present invention relates to an unmanned aircraft constituted by a small-sized drone (multicopter) capable of unattended flight, an unmanned helicopter, or the like, particularly to an unmanned aircraft capable of suppressing damage caused by a crash of the unmanned aircraft.

BACKGROUND ART

In recent years, an unmanned aircraft constituted by a small-sized drone (multicopter) capable of unattended flight, an unmanned helicopter, or the like is becoming popular. This unmanned aircraft is being used in various industries including measurement, disaster relief, research on natural environment, relay of sports, delivery, and pesticide spraying. As the technology of this unmanned aircraft continues to advance, further expansion of applications thereof is expected.

By the way, it can be said that spread of an unmanned aircraft can be achieved only when safety thereof is sufficiently secured. The most important thing to consider in safety of an unmanned aircraft is a crash caused by malfunction or the like during flight. At the time of this crash, an unmanned aircraft is almost uncontrollable in many cases. Therefore, it is difficult to stop fall of the aircraft that has started the crash. Particularly in a case where an aircraft falls on a private house, a road, a railroad, or the like at the time of a crash, serious damage may be caused. For this reason, there has been a demand for a technique capable of minimizing damage in a case where an aircraft crashes in an uncontrollable state due to malfunction or the like during flight.

Conventionally, a technique for preventing this crash of an unmanned aircraft has been proposed (see, for example, Patent Literature 1). According to the technique disclosed in Patent Literature 1, even in a case where a transmitter used for operating an aircraft is unexpectedly switched and an operator does not notice that the transmitter has been switched, by operating an automatic operating means, a crash of the aircraft is prevented.

CITATION LIST

Patent Literature

Patent Literature 1: JP 2004-359071 A

SUMMARY OF INVENTION

Technical Problem

By the way, the above-described technique disclosed in Patent Literature 1 assumes that an unmanned aircraft is in a controllable state without any malfunction. For this reason, Patent Literature 1 does not disclose a special technique for reducing damage of a crash in a case where an unmanned aircraft itself malfunctions and falls into a state where automatic operating is impossible.

Therefore, the present invention has been achieved in view of the above problems. An object of the present invention is to provide an unmanned aircraft capable of minimizing damage due to a crash caused by malfunction or the like during flight.

Solution to Problem

In order to solve the above problems, the present inventors have invented an unmanned aircraft capable of avoiding falling to a fall avoidance area as much as possible by controlling the aircraft so as to increase a flight speed in a case where it is determined that the aircraft is approaching the fall avoidance area and by causing the aircraft to fall beyond the fall avoidance area in a case where the aircraft crashes due to malfunction.

An unmanned aircraft according to a first aspect of the invention includes: a flight route setting unit for setting a flight route on map information including a fall avoidance area; a flight control unit for performing control such that the aircraft flies on a flight route set by the flight route setting unit; and a position information acquiring unit for acquiring information at each position during flight on the flight route in relation to the map information in real time to determine whether or not the aircraft is approaching the fall avoidance area, and is characterized in that in a case where the position information acquiring unit determines that the aircraft is approaching the fall avoidance area, the flight control unit performs control so as to increase a flight speed, and an acceleration start position and an acceleration for increasing the flight speed are determined based on a positional relationship between information at each position acquired by the position information acquiring unit and the fall avoidance area, a flight altitude, and a flight speed.

An unmanned aircraft according to a second aspect of the invention includes: a flight route setting unit for setting a flight route on map information including a fall avoidance area; a flight control unit for performing control such that the aircraft flies on a flight route set by the flight route setting unit; and a position information acquiring unit for acquiring information at each position during flight on the flight route in relation to the map information in real time to determine whether or not the aircraft is approaching the fall avoidance area, and is characterized in that the flight control unit performs control so as to increase a flight speed in a case where the position information acquiring unit determines that the aircraft is approaching the fall avoidance area, a flight altitude detecting unit for detecting a flight altitude during flight on the flight route and a flight speed detecting unit for detecting a flight speed increased by the flight control unit are further included, and the flight control unit calculates a falling time based on a flight altitude detected by the flight altitude detecting unit, specifies a critical flight end point where an estimated falling position determined from the calculated falling time and the increased flight speed is located on a terminal end of the fall avoidance area, and causes the aircraft to fly at least to a position beyond the specified critical flight end point at the increased flight speed or higher.

An unmanned aircraft according to a third aspect of the invention is characterized in that in the second aspect of the invention, the flight control unit calculates a falling time based on a flight altitude detected by the flight altitude detecting unit, specifies a critical flight end point where an estimated falling position determined from the calculated falling time and the increased flight speed is located on a terminal end of the fall avoidance area, and determines a deceleration point at which a reduction in flight speed is started based on the critical flight end point.

An unmanned aircraft according to a fourth aspect of the invention includes: a flight route setting unit for setting a flight route on map information including a fall avoidance area; a flight control unit for performing control such that the aircraft flies on a flight route set by the flight route setting unit; and a position information acquiring unit for acquiring information at each position during flight on the flight route in relation to the map information in real time to determine whether or not the aircraft is approaching the fall avoidance area, and is characterized in that the flight control unit performs control so as to increase a flight speed in a case where the position information acquiring unit determines that the aircraft is approaching the fall avoidance area, a flight altitude detecting unit for detecting a flight altitude during flight on the flight route and a flight speed detecting unit for detecting a flight speed increased by the flight control unit are further included, and the flight control unit calculates a falling time based on a flight altitude detected by the flight altitude detecting unit, specifies a critical flight start point where an estimated falling position determined from the calculated falling time and the increased flight speed is located on a starting end of the fall avoidance area, performs control so as to reduce the speed in a case where a current position acquired by the position information acquiring unit is in front of the critical flight start point, and performs control so as to increase the speed in a case where the current position is behind the critical flight start point.

An unmanned aircraft according to a fifth aspect of the invention includes: a flight route setting unit for setting a flight route on map information including a fall avoidance area; a flight control unit for performing control such that the aircraft flies on a flight route set by the flight route setting unit; and a position information acquiring unit for acquiring information at each position during flight on the flight route in relation to the map information in real time to determine whether or not the aircraft is approaching the fall avoidance area, and is characterized in that the flight control unit performs control so as to increase a flight speed in a case where the position information acquiring unit determines that the aircraft is approaching the fall avoidance area, a flight altitude detecting unit for detecting a flight altitude during flight on the flight route and a flight speed detecting unit for detecting a flight speed increased by the flight control unit are further included, and the flight control unit calculates a falling time based on a flight altitude detected by the flight altitude detecting unit, specifies a critical flight start point where an estimated falling position determined from the calculated falling time and the increased flight speed is located on a starting end of the fall avoidance area, lowers a flight altitude in a case where a current position acquired by the position information acquiring unit is in front of the critical flight start point, and raises the flight altitude in a case where the current position is behind the critical flight start point.

An unmanned aircraft according to a sixth aspect of the invention is characterized in that in the third aspect of the invention, the flight control unit reduces the flight speed to a speed lower than a flight speed before the flight speed is increased.

Advantageous Effects of Invention

According to the present invention having the above-described configuration, in a case where it is determined that an aircraft is approaching a fall avoidance area, control is performed so as to increase a flight speed. As a result, even in a case where an unmanned aircraft falls into an uncontrollable state due to sudden malfunction during flight and crashes, falling to the fall avoidance area can be avoided as much as possible.

DESCRIPTION OF EMBODIMENTS

Hereinafter, an embodiment for implementing an unmanned aircraft to which the present invention is applied will be described in detail with reference to the drawings.

Figure 1:
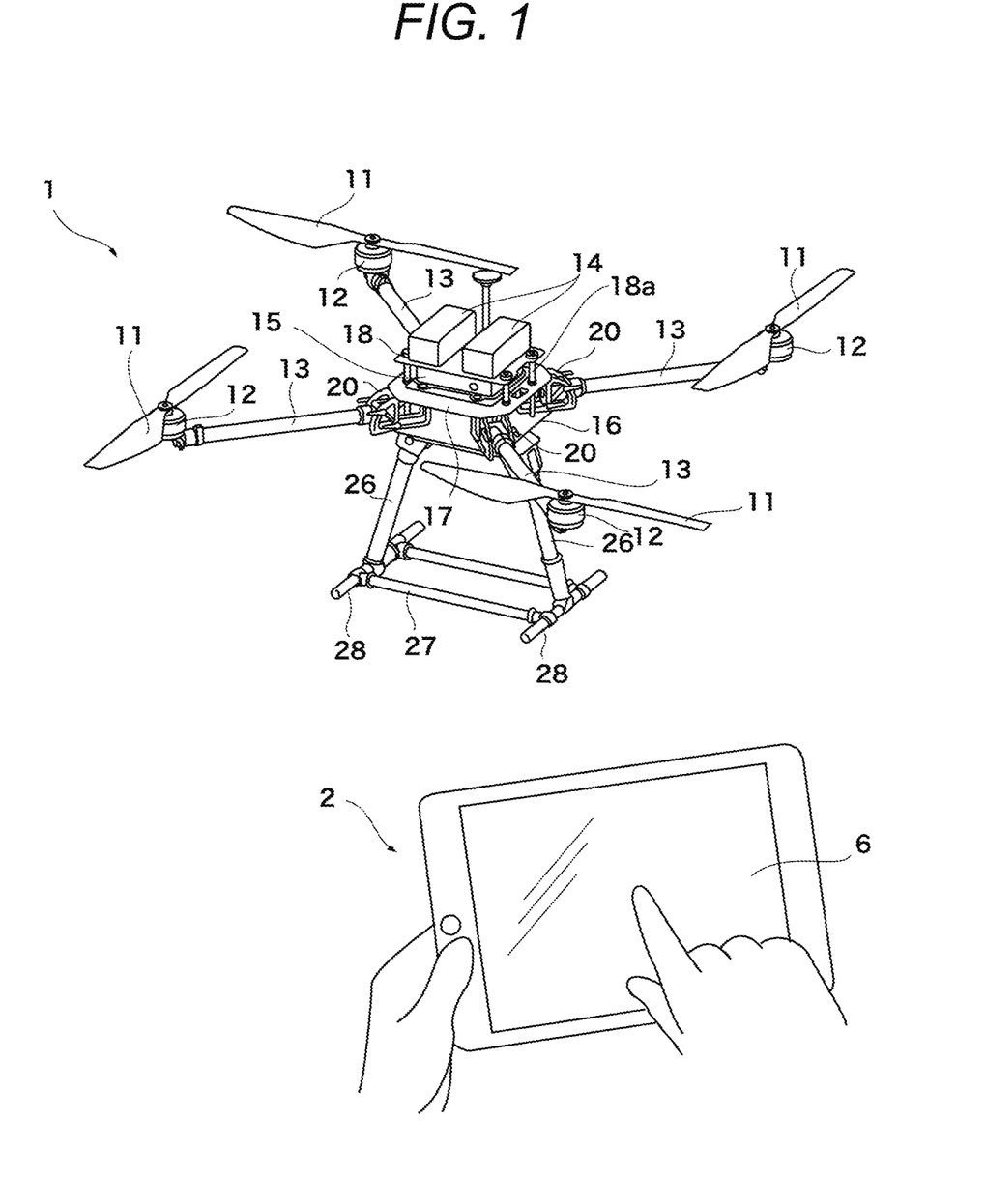
FIG. 1 is a diagram illustrating external configurations of an unmanned aircraft to which the present invention is applied and an operating terminal for operating the unmanned aircraft.

FIG. 1 illustrates external configurations of an unmanned aircraft 1 to which the present invention is applied and an operating terminal 2 for operating the unmanned aircraft 1.

The unmanned aircraft 1 is a small-sized aircraft capable of unattended flight, and is typically a drone (multicopter). However, the unmanned aircraft 1 is not limited thereto, and may be embodied by an unmanned helicopter or the like. The unmanned aircraft 1 includes a rotor 11, a rotor motor 12 for driving the rotor 11, a motor stay 13 with the rotor motor 12 attached to a tip thereof, an installation tool 20 attached to a base of the motor stay 13, a first central plate 16 and a second central plate 17 for sandwiching the installation tool 20 from above and below, a control unit 15 disposed on the second central plate 17, a third central plate 18 disposed above the second central plate 17 so as to be apart from and parallel to the second central plate 17, and a battery 14 disposed on the third central plate 18.

The unmanned aircraft 1 also includes a plurality of leg portions 26 extending downward from the first central plate 16, two skids 28 each disposed at a lower end of each of the leg portions 26, and a placement arm 27 laid between the two skids 28.

The rotor 11 rotates based on rotation of the rotor motor 12 and can apply a buoyant force to the unmanned aircraft 1. In the present embodiment, a quadcopter having four rotors 11 will be exemplified. However, the present invention is not limited thereto and may be embodied as a helicopter constituted by one rotor 11, a tricopter constituted by three rotors 11, a hexacopter constituted by six rotors 11, or an octocopter constituted by eight rotors 11 depending on required flight performance, reliability against malfunction, allowable cost, and the like.

The rotor motor 12 is disposed for each of the rotors 11 and is rotatable based on electric power supplied from the battery 14 via the motor stay 13. The rotor motor 12 is not limited as long as having the above function, and any commercially available rotor motor can be applied. By rotating the rotor motor 12, the rotor 11 can be rotated, and the unmanned aircraft 1 can be raised or lowered immediately in a vertical direction or can stand still on the spot. In a case where the unmanned aircraft 1 is moved back and forth or from side to side, the rotation number of the rotor motor 12 in a traveling direction is decreased, and the rotation number of the rotor motor 12 in the opposite direction to the traveling direction is increased. As a result, the unmanned aircraft 1 is bent forward with respect to the traveling direction and can move in the traveling direction. It is also possible to rotate the unmanned aircraft 1 itself by adjusting an output according to the rotation direction of the rotor motor 12. Such control of the rotation number of the rotor motor 12 is performed via the control unit 15.

The motor stay 13 extends from the first central plate 16 and the second central plate 17 in different directions. Particular in a case of a quadcopter having four rotors 11, the motor stays 13 supporting the rotors 11 are extended so as to be apart from one another by about 90° in plan view. The motor stay 13 may be constituted by a tube body made of, for example, metal, resin, carbon, or another material. In such a case, a cable for supplying electric power from the battery 14 can be inserted into the tube body of the motor stay 13.

The first central plate 16 and the second central plate 17 are each constituted by a plate-shaped body made of metal, resin, or the like. The first central plate 16 and the second central plate 17 are disposed so as to be substantially parallel to each other via the installation tool 20 to be sandwiched. A screw hole or the like (not illustrated) necessary for attaching each of the leg portions 26 is formed in advance on the first central plate 16. Similarly, a screw hole necessary for attaching the control unit 15 is formed in advance on the second central plate 17.

The control unit 15 is constituted by a casing for housing an integrated circuit and a device necessary for various kinds of control. The control unit 15 is fixed to a screw hole formed on the second central plate 17 via a screw. Details of a block configuration of the control unit 15 will be described later.

The third central plate 18 is constituted by a plate-shaped body made of metal, resin, or the like. The third central plate 18 is fixed via a long screw 18a disposed upright on a surface of the second central plate 17, and is thereby disposed so as to be apart from and parallel to the second central plate 17.

The battery 14 is a battery for supplying electric power necessary for driving the control unit 15 and the rotor motor 12. The battery 14 may be detachable and chargeable.

The skids 28 disposed at lower ends of the leg portions 26 are disposed for grounding the unmanned aircraft 1 in a case where the unmanned aircraft 1 lands on the ground.

Figure 2:
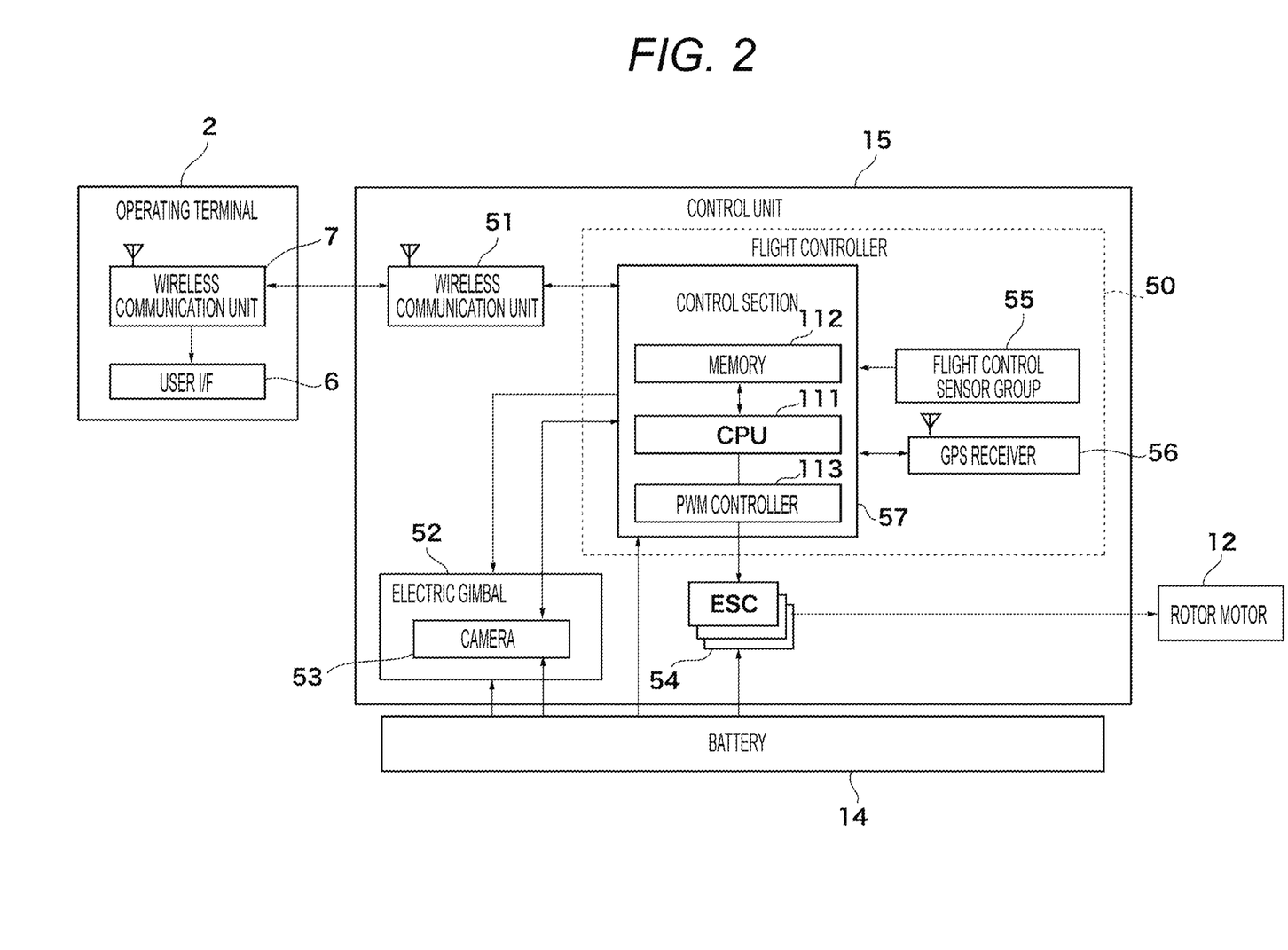
FIG. 2 is a diagram illustrating a detailed block configuration of a control unit.

Next, a detailed configuration of the control unit 15 will be described. As illustrated in FIG. 2, the control unit 15 includes a flight controller 50, a wireless communication unit 51, an electric gimbal 52, a camera 53, and an electronic speed controller (ESC) 54. The wireless communication unit 51, the electric gimbal 52, the camera 53, and the ESC 54 are connected to the flight controller 50 as a center. Note that the electric gimbal 52 and the camera 53 are not indispensable and may be omitted.

The wireless communication unit 51 also includes an antenna for performing frequency conversion necessary for wireless communication with the operating terminal 2 and other various conversion processes to convert an electric signal into an electric wave or convert an electric wave into an electric signal. The wireless communication unit 51 converts operating information superimposed on an electric wave transmitted from the operating terminal 2 into an electric signal, and then outputs the electric signal to the flight controller 50. As a result, control of the flight controller 50 based on the operating information from the operating terminal 2 is achieved. The wireless communication unit 51 converts data sent from the flight controller 50 into a radio wave and transmits the radio wave to the operating terminal 2. Incidentally, if possible, the data may be transmitted to a public communication network including the Internet network. Note that the wireless communication unit 51 may acquire various kinds of information from a public communication network via wireless communication and may transmit the information to the flight controller 50.

The flight controller 50 includes a control section 57, and a flight control sensor group 55 and a global navigation satellite system (GNSS) receiver 56 connected to the control section 57.

The control section 57 includes a central processing unit (CPU) 111, and a memory 112 and a PWM controller 113 connected to the CPU 111.

The memory 112 is storage embodied as a read only memory (ROM) or random access memory (RAM). The ROM stores a program for controlling hardware resources of the entire control unit 15. The RAM is used as a work area used for data accumulation, development, or the like, and temporarily stores various commands for controlling the hardware resources of the entire control unit 15.

The CPU 111 is a so-called central processing unit for controlling all the components. The CPU 111 reads a program stored in the memory 112 and notifies each component of a command for performing various operations. For example, if the program stored in the memory 112 relates to a method for determining a flight route of the unmanned aircraft 1 or a flight method, various commands for flight based on the program are caused to stand still and transmitted to each component. If the program stored in the memory 112 relates to a method for spraying a chemical solution by the unmanned aircraft 1, various commands for spraying a chemical solution based on the program are generated and transmitted to each component.

In addition, the CPU 111 generates various commands based on operating information sent from the wireless communication unit 51 and other information, and transmits the commands to each component. In addition, the CPU 111 controls each component based on data sent from the flight control sensor group 55 and current position information of the unmanned aircraft 1 sent from the GNSS receiver 56. Furthermore, the CPU 111 controls the electric gimbal 52 and the camera 53 and also transmits a necessary command to the PWM controller 113.

Under control of the CPU 111, the PWM controller 113 controls the rotation number, the rotation speed, and the like of the rotor motor 12 via the ESC 54.

The flight control sensor group 55 includes at least an acceleration sensor, an angular velocity sensor, an atmospheric pressure sensor (altitude sensor), and a geomagnetic sensor (azimuth sensor), and further includes various sensors including an altimeter for detecting a flight altitude, an anemometer for detecting a wind speed and a wind direction, an acceleration sensor for detecting an inclination angle and an inclination direction of an aircraft, and a gyro sensor. Note that the flight control sensor group 55 is not limited to a flight control sensor group including all of these sensors. For example, an acceleration sensor and an angular velocity sensor can detect a flight speed of the unmanned aircraft 1. In addition, a gyro sensor, an acceleration sensor, and an angular velocity sensor can detect an inclination direction and an inclination angle of the unmanned aircraft 1. In addition, an anemometer can detect a wind direction and a wind speed of a wind blowing on the spot during flight of the unmanned aircraft 1 on real time. An altimeter can detect a flight altitude of the unmanned aircraft 1 in real time. The flight control sensor group 55 transmits detected data to the control section 57.

The GNSS receiver 56 acquires current position information during flight of the unmanned aircraft 1 in real time based on a satellite positioning signal sent from an artificial satellite. The GNSS receiver 56 transmits the acquired position information to the control section 57.

The electric gimbal 52 is a rotary table on which the camera 53 is placed. The electric gimbal 52 is rotatable under control of the CPU 111 in the control section 57. By rotating this electric gimbal 52, a photographing direction of the camera 53 can be changed. The electric gimbal 52 may include a vibration absorbing mechanism for preventing vibration from the unmanned aircraft 1 from being transmitted to the camera 53.

The camera 53 images a subject in a photographing direction determined based on rotation of the electric gimbal 52. An imaging timing of the camera 53 is controlled by the CPU 111. The camera 53 transmits a photographed image to the control section 57. The image transmitted to the control section 57 may be stored in the memory 112 under control of the CPU 111, and may be further sent to a public communication network via the wireless communication unit 51 as necessary.

Incidentally, among the above-described components, each of the flight controller 50, the electric gimbal 52, the camera 53, and the ESC 54 is connected to the battery 14, and electric power is supplied thereto.

The operating terminal 2 is constituted by a terminal device capable of wireless communication, such as a personal computer (PC), a portable terminal, a smartphone, a tablet type terminal, or a wearable terminal, but is not limited thereto, and may be embodied by a dedicated controller. The operating terminal 2 includes a user I/F 6 for a user to actually perform a desired operation and a wireless communication unit 7 connected to the user I/F 6.

The user I/F 6 includes a touch panel, a button, a lever, and the like for inputting operating information for operating the unmanned aircraft 1. The user I/F 6 also includes a liquid crystal panel and the like for displaying various kinds of information to a user. The user I/F 6 transmits input operating information to the wireless communication unit 7. In a case where various kinds of information received by the wireless communication unit 7 is transmitted, the user I/F 6 displays the information to a user via a liquid crystal panel or the like as necessary.

The wireless communication unit 7 also includes an antenna for performing frequency conversion necessary for wireless communication with the unmanned aircraft 1 and other various conversion processes to convert an electric signal into an electric wave or convert an electric wave into an electric signal. The wireless communication unit 7 outputs information transmitted from the unmanned aircraft 1 and information sent from a public communication network to the user I/F 6. In addition, the wireless communication unit 7 converts operating information sent from the user I/F 6 into a radio wave and transmits the radio wave to the unmanned aircraft 1.

Next, an operation of the unmanned aircraft 1 having the above-described configuration will be described.

First, the unmanned aircraft 1 accepts input of map information. FIG. 3(a) exemplifies map information input of which has been accepted. The map information includes a forest, a mountain, an ocean, and the like with few passengers, as well as an area where people actually come and go, such as a road or a private house. Basically, this map information is acquired as electronic data.

Such map information is acquired via the user I/F 6 in the operating terminal 2 and transmitted to the wireless communication unit 51 in the unmanned aircraft 1 via the wireless communication unit 7. The control section 57 in the flight controller 50 acquires the map information and stores the map information in the memory 112 as necessary. Incidentally, the map information may be acquired directly by the unmanned aircraft 1 from a public communication network.

Next, the CPU 111 actually formulates a flight plan for the map information based on a scattering target area. The formulation of a flight plan is executed by reading a flight plan formulation program stored in the memory 112. Note that the formulation of a flight plan is not limited to the case based on reading from the memory 112, but may be based on information input from the user I/F 6. In such a case, every time input information on a flight plan is received from the user I/F 6, the information may be transmitted to the control section 57 of the unmanned aircraft 1.

The CPU 111 formulates a flight route in order to achieve a desired flight purpose with respect to acquired map information. For example, it is assumed that the flight route indicated by the solid arrow in FIG. 3(a) is set. On this flight route, an aircraft passes over a private house, a road, or the like. Therefore, it is necessary to avoid a crash of the unmanned aircraft 1 into such a private house or road. An area in which falling of the unmanned aircraft 1 needs to be avoided, such as a private house or a road, is referred to as a fall avoidance area below. The CPU 111 performs control such that the fall avoidance area is determined from map information in advance.

FIG. 3(b) illustrates a fall avoidance area determined from map information. The hatched area in FIG. 3(b) is the determined fall avoidance area. As a method for determining a fall avoidance area, an area may be designated in advance as a fall avoidance area in map information, or by analyzing image data, an image area of a road or a private house may be specified, and this area may be assigned as a fall avoidance area. The control section 57 can identify that a formulated flight route passes through a fall avoidance area determined as described above. Furthermore, in order to avoid falling into a fall avoidance area during flight on this flight route, the following control is performed.

First, the CPU 111 sets such a flight route, and then performs control for causing the unmanned aircraft 1 to fly based on the flight route to the PWM controller 113. Under the control of the CPU 111, the PWM controller 113 controls the rotation number, the rotation speed, the rotation direction, and the like of the rotor motor 12 via the ESC 54 to cause the aircraft to fly on the flight route illustrated in FIG. 3.

Figure 3:
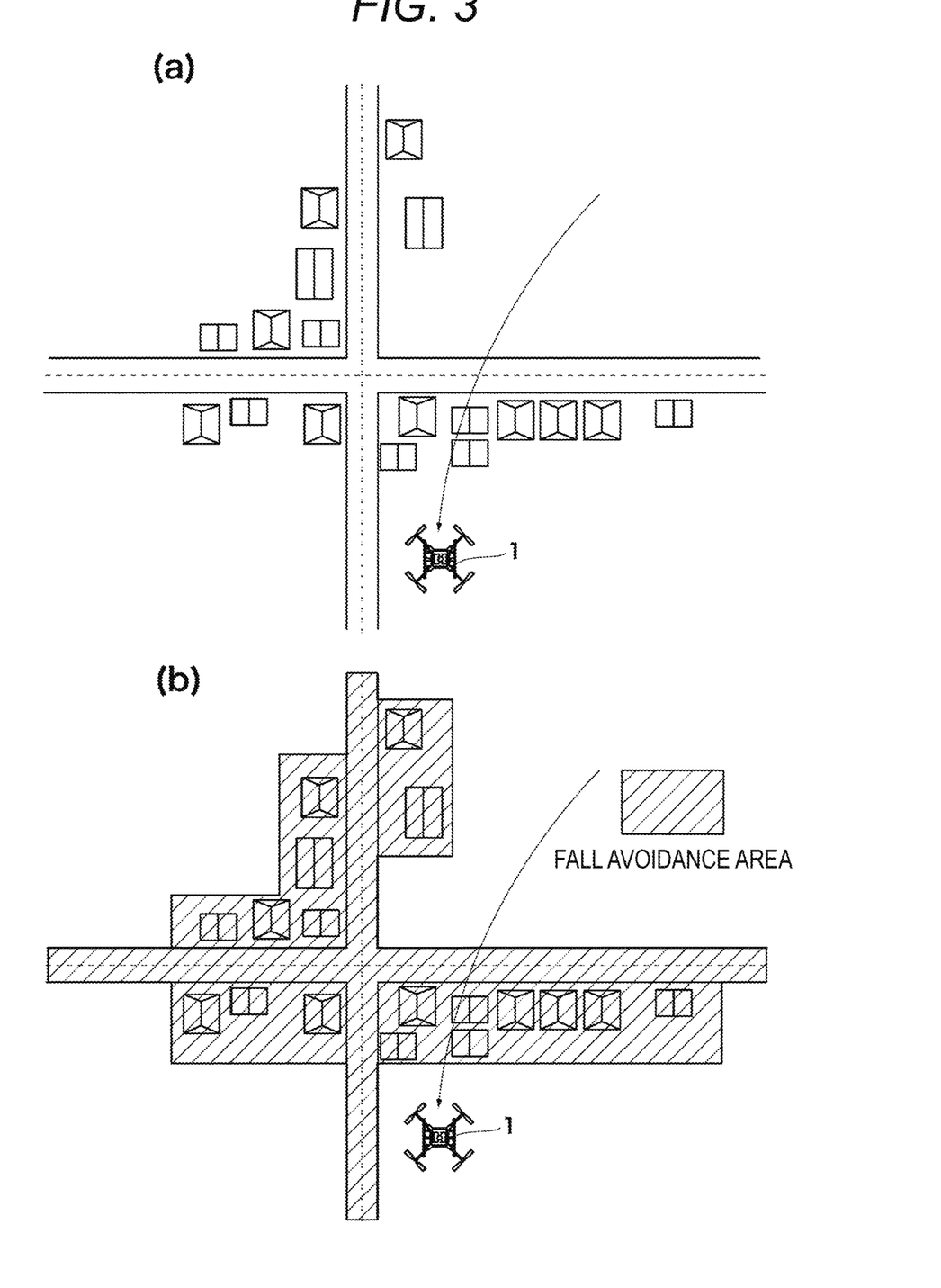
FIG. 3(a) is a diagram exemplifying map information that has accepted an input.
FIG. 3(b) is a diagram illustrating a fall avoidance area determined from map information.

During flight on this flight route, a current position of the flying unmanned aircraft 1 on a flight route is detected in real time. This detection of position information is performed via the GNSS receiver 56. Detected position information is sent from the GNSS receiver 56 to the control section 57. The control section 57 can grasp a current position of the unmanned aircraft 1 in relation to map information.

In a process of repeatedly performing the flight of the unmanned aircraft 1 and the real time detection of position information, it is determined whether or not the unmanned aircraft 1 is approaching the above-specified fall avoidance area. As described above, this fall avoidance area is already known in relation to map information, and a current position can also be grasped in real time in relation to the map information. Therefore, the control section 57 can acquire a positional relationship between a current position grasped in real time on the map information and the fall avoidance area. Therefore, if the control section 57 can grasp that the positional relationship between a current position and the fall avoidance area is close, the control section 57 can determine that the unmanned aircraft 1 is approaching the fall avoidance area. Incidentally, whether or not the unmanned aircraft 1 is approaching the fall avoidance area may be determined based on whether or not a distance between the unmanned aircraft 1 and the fall avoidance area falls within a predetermined threshold value.

In a case where it is determined that the unmanned aircraft 1 is approaching the fall avoidance area, the control section 57 performs control for increasing a flight speed to the PWM controller 113. The PWM controller 113 increases the flight speed by increasing the rotation number and the rotation speed of the rotor motor 12 via the ESC 54. The speed to be increased may be any speed as long as exceeding a current flight speed.

As described above, by performing control to increase the flight speed when the unmanned aircraft 1 approaches the fall avoidance area, the following effects are exhibited.

Figure 4:
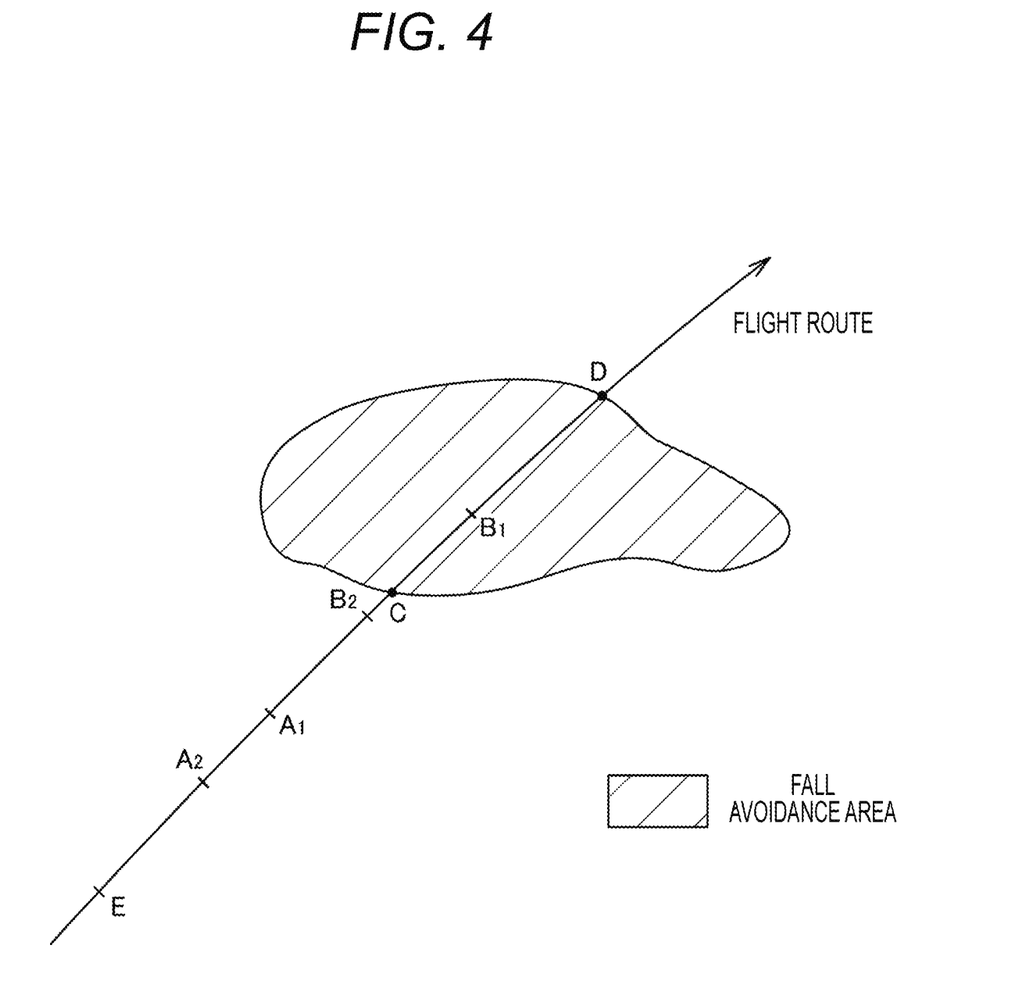
FIG. 4 is a plan view illustrating a relationship between each point on a flight route of an unmanned aircraft and a fall avoidance area.
Figure 5:
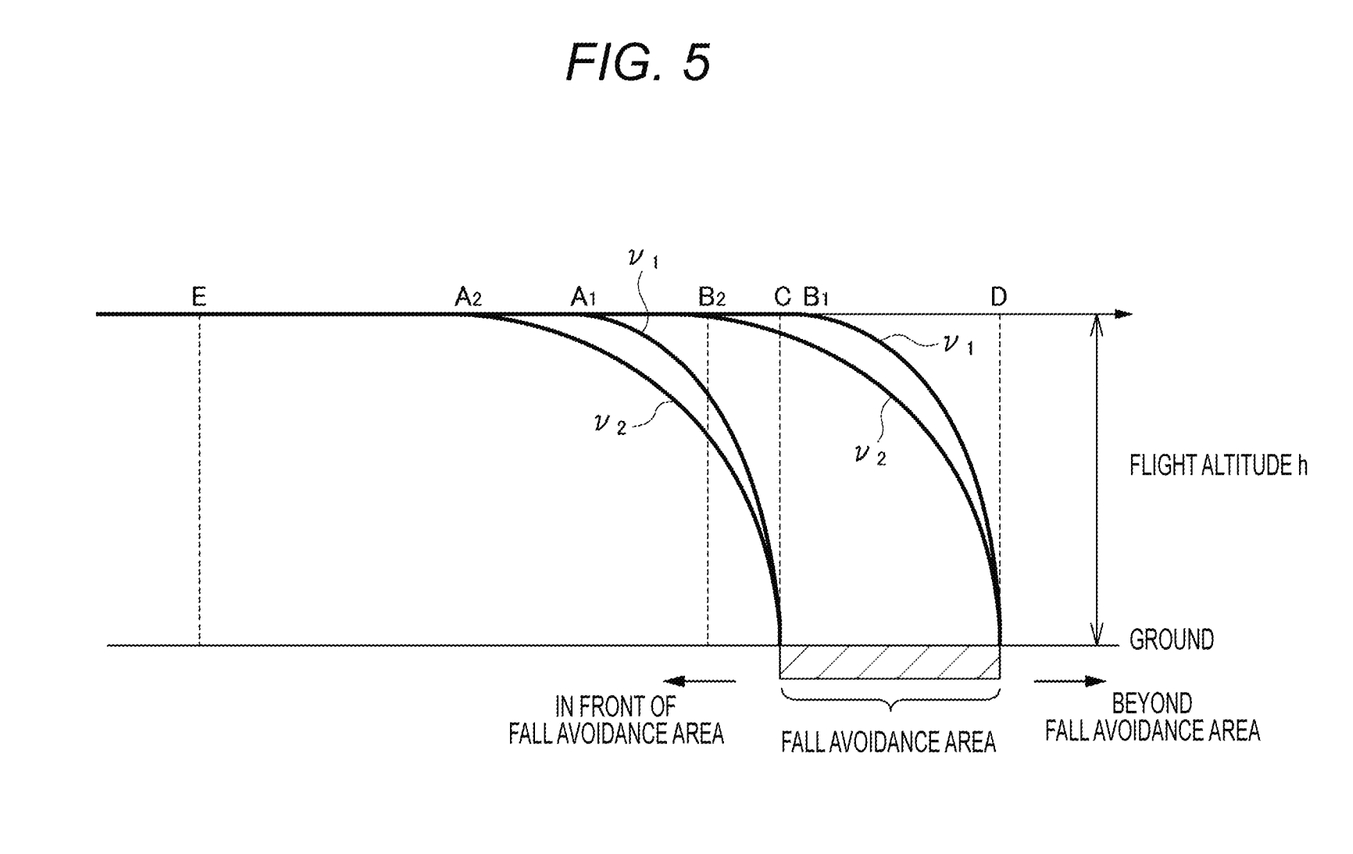
FIG. 5 is a diagram illustrating a relationship between a flight speed at each point on a flight route and a fall trajectory.

FIG. 4 is a plan view illustrating a relationship between each point on a flight route of the unmanned aircraft 1 and a fall avoidance area. FIG. 5 illustrates a relationship between a flight speed at each point on a flight route and a fall trajectory.

Intersections between a circumferential edge of a fall avoidance area and a flight route are represented by C and D. The point C is a starting end of the fall avoidance area directed to a traveling direction of the flight route, and the point D is a terminal end of the fall avoidance area directed to the traveling direction of the flight route. The unmanned aircraft 1 flying on the flight route needs to avoid falling between the starting end C and the terminal end D at the time of a crash and needs to fall only in front of the starting end C in the traveling direction or beyond the terminal end D in the traveling direction.

Here, in a case where it is assumed that the flight altitude of the unmanned aircraft 1 is a height h from the ground, a falling time of the unmanned aircraft 1 is uniformly represented by $\sqrt{(2h/g)}$ (g is gravitational acceleration). However, a falling position of the unmanned aircraft 1 is almost specified to be a position advanced by a value obtained by multiplying a current flight speed v by the falling time $\sqrt{(2h/g)}$.

Figure 6:
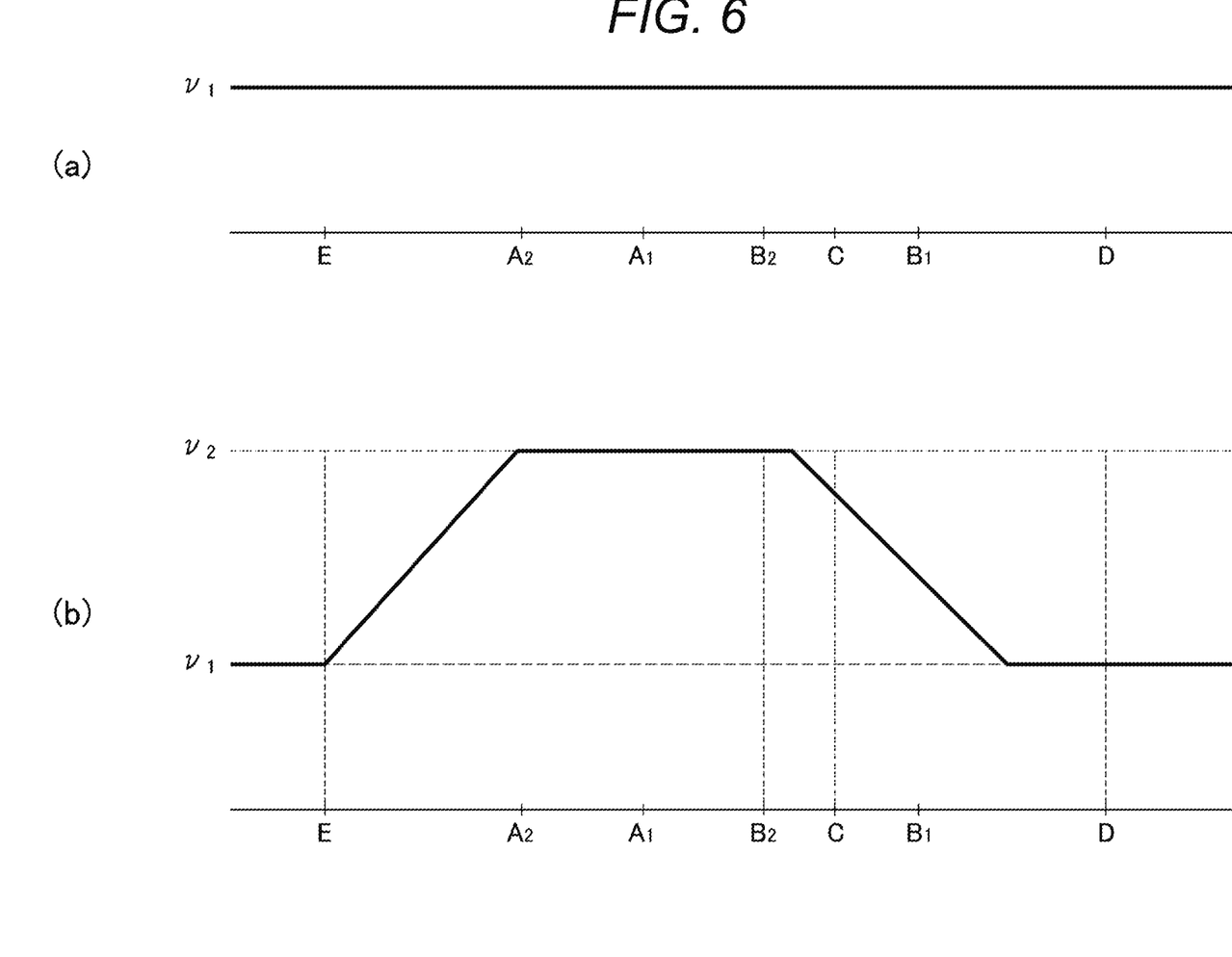
FIG. 6(a) is a diagram exemplifying a case where an unmanned aircraft flies at a uniform speed $v_1$.
FIG. 6(b) is a diagram exemplifying a case where control is performed so as to increase a flight speed.

Here, as illustrated in FIG. 6(a), a case where the unmanned aircraft 1 flies at a uniform speed $v_1$ is exemplified. In a case where the unmanned aircraft 1 flying at the speed $v_1$ starts falling at a position $A_1$, an estimated falling position is a position advanced from the position $A_1$ by $v_1 \times \sqrt{(2h/g)}$. Here, a position where the estimated falling position just coincides with the starting end C on a flight trajectory is defined as a critical flight start point. When a height is h and a speed is $v_1$, the estimated falling position coincides with the starting end C. Therefore, $A_1$ can be referred to as a critical flight start point for the starting end C.

Similarly, in a case where the unmanned aircraft 1 flying at the speed $v_1$ starts falling at a position $B_1$, an estimated falling position is a position advanced from $B_1$ by $v_1 \times \sqrt{(2h/g)}$. Here, a position where the estimated falling position just coincides with the terminal end D on a flight trajectory is defined as a critical flight end point. When a height is h and a speed is $v_1$, the estimated falling position coincides with the terminal end D. Therefore, $B_1$ can be referred to as a critical flight end point for the terminal end D. In a case where the unmanned aircraft 1 flying at the speed $v_1$ starts falling between the critical flight start point $A_1$ and the critical flight end point $B_1$, the unmanned aircraft 1 falls into this fall avoidance area.

If the length of the fall avoidance area in a flight direction is 4 m and $v_1$ is 4 m/s, the distance between $A_1$ and $B_1$ is also 4 m, and time to pass through this area between $A_1$ and $B_1$ is one second. In a case where the unmanned aircraft 1 starts falling due to malfunction in one second during which the unmanned aircraft 1 passes through the area between the critical flight start point $A_1$ and the critical flight end point $B_1$, the unmanned aircraft 1 falls into this fall avoidance area.

Here, when the unmanned aircraft 1 is approaching the fall avoidance area, as illustrated in FIG. 6(b), by performing control to increase a flight speed, the following effects are exhibited. In the speed pattern of FIG. 6(b), the starting end C and the terminal end D of the estimated falling position are grasped, and then acceleration is started at a point E in front of the starting end C in a flight direction. Such a point at which acceleration is started is referred to as an acceleration start position below. Then, the speed is increased from $v_1$ to $v_2$ until the unmanned aircraft 1 reaches $A_2$. In the pattern, thereafter, the unmanned aircraft 1 flies at the constant speed $v_2$, reduces the speed after flying beyond $B_2$, and returns the speed to $v_1$ again.

Here, when a height is h and a speed is $v_2$, the estimated falling position coincides with the starting end C. Therefore, $A_2$ can be referred to as a critical flight start point for the starting end C. Similarly, when a height is h and a speed is $v_2$, the estimated falling position coincides with the terminal end D. Therefore, $B_2$ can be referred to as a critical flight end point for the terminal end D. In a case where the unmanned aircraft 1 starts falling between the critical flight start point $A_2$ and the critical flight end point $B_2$, the unmanned aircraft 1 falls into this fall avoidance area. If the length of the fall avoidance area in a flight direction is 4 m and $v_2$ is 6 m/s, the distance between $A_2$ and $B_2$ is also 4 m, and time to pass through this area between $A_2$ and $B_2$ is ⅔ seconds. In a case where the unmanned aircraft 1 starts falling due to malfunction in ⅔ seconds during which the unmanned aircraft 1 passes through the area between the critical flight start point $A_2$ and the critical flight end point $B_2$, the unmanned aircraft 1 falls into this fall avoidance area. However, passing time from the critical flight start point to the critical flight end point is shorter than the case of the speed $v_1=4$ m/s. A malfunction ratio per unit time is not clearly correlated with a speed excluding a speed close to marginal performance of a drone. Therefore, in a case where it is assumed that a malfunction ratio per unit flight time is the same, by increasing a speed from $v_1$ to $v_2$, a passing time from the critical flight start point to the critical flight end point is shortened.

Therefore, a probability of being able to avoid falling of the unmanned aircraft 1 into the fall avoidance area increases.

As described above, according to the present invention, even in a case where the unmanned aircraft 1 falls into an uncontrollable state due to sudden malfunction during flight and crashes, falling into the fall avoidance area can be avoided as much as possible.

Actually, in order to avoid such falling into the fall avoidance area as much as possible, a speed is increased from $v_1$ to $v_2$. However, the acceleration start position E may be any position, and the acceleration may be any value as long as the speed reaches the speed $v_2$ before the unmanned aircraft 1 reaches $A_2$. For example, by setting the acceleration to a small value while starting acceleration before the unmanned aircraft 1 reaches the acceleration start position E, an inclination of the speed before the unmanned aircraft 1 reaches $A_2$ in FIG. 6(b) may be gentle. Alternatively, by rapidly increasing the speed just before the unmanned aircraft 1 reaches $A_2$, the inclination of the speed before the unmanned aircraft 1 reaches $A_2$ in FIG. 6(b) may be sharp. The acceleration start position and the acceleration are determined based on information such as a current flight speed in addition to a positional relationship between a current position grasped in real time on map information and the fall avoidance area.

If a speed is $v_2$ at the critical flight end point $B_2$, in a case where the unmanned aircraft 1 falls at this point $B_2$, the unmanned aircraft 1 crashes just into the terminal end D of the fall avoidance area. Meanwhile, if the speed is equal to or more than $v_2$ at a point beyond the critical flight end point $B_2$, the unmanned aircraft 1 crashes into an area beyond the terminal end D of the fall avoidance area. Therefore, according to the present invention, as long as the speed $v_2$ is maintained to a point beyond the critical flight end point $B_2$, flight may be performed at any flight speed thereafter. After the aircraft flies beyond the critical flight end point $B_2$, the speed may be reduced to the speed $v_1$, or the speed may be increased or maintained at the same speed without reducing the speed. The speed cannot be reduced abruptly. Therefore, the speed only needs to be maintained at $v_2$ until the aircraft flies beyond the critical flight end point $B_2$. However, in order to secure safety, the speed is desirably maintained at the speed $v_2$ until the aircraft reaches $B_1$.

In order to achieve the control, in the present invention, a flight altitude and the increased flight speed $v_2$ are detected, a falling time is calculated based on the detected flight altitude, and the critical flight end point $B_2$ where an estimated falling position determined from the calculated falling time and flight speed $v_2$ is located on the terminal end D of the fall avoidance area is specified by calculation. Then, control is performed such that the aircraft flies to a position beyond the specified critical flight end point $B_2$ at the flight speed $v_2$ or more.

Note that the present invention is not limited to the case where the deceleration point from the flight speed $v_2$ to $v_2$ is set to a position beyond the critical flight end point $B_2$, and the deceleration point may be set to a position before the critical flight end point $B_2$. Even in such a case, it is possible to lower a probability of falling into the fall avoidance area at least by increasing a flight speed to the flight speed $v_2$. That is, according to the present invention, it is only required to specify the critical flight end point $B_2$ and to determine the deceleration point at which a reduction in flight speed is started based on the specified critical flight end point $B_2$.

The flight speed at each point on the flight route is not limited to the flight speed illustrated in FIG. 6(b) described above. For example, in the example illustrated in FIG. 7(a), an acceleration start position is set near $A_1$. In this example, the aircraft flies at the speed $v_1$ until reaching the vicinity of $A_1$, accelerates from the vicinity of $A_1$ to reach the speed $v_2$, then decelerates after reaching a position beyond $B_2$, and returns the speed to $v_1$. As illustrated in FIG. 5, there is a higher possibility that the aircraft falls in front of the starting end C of the fall avoidance area in a case of the speed $v_1$ than in a case of the speed $v_2$ before the aircraft reaches $A_1$. For this reason, by reducing the speed as much as possible before the aircraft reaches $A_1$, increasing the speed after the aircraft reaches the vicinity of $A_1$, and reducing the speed after the aircraft passes through $B_2$, even if malfunction occurs immediately after the aircraft flies beyond $B_2$, the aircraft can fall at a position beyond the terminal end D of the fall avoidance area. This makes it possible to further lower the probability of a crash into the fall avoidance area.

Figure 7:
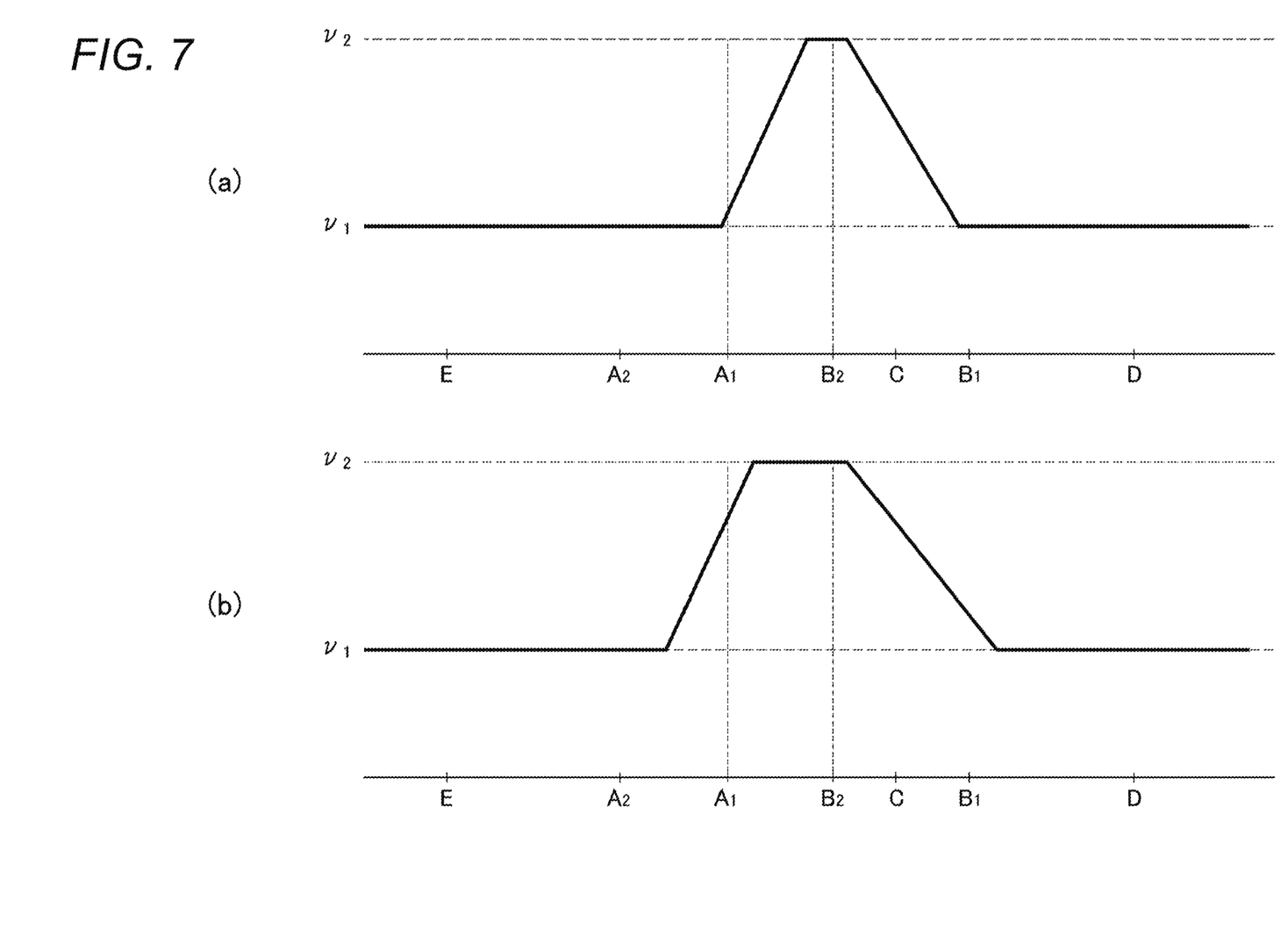
FIG. 7 is a view for explaining another example of a flight speed at each point on a flight route.

In addition, FIG. 7(b) illustrates an example in which the acceleration start position is set in front of $A_1$. However, even in such a case, it is possible to increase a possibility of falling in front of the starting end C, and to lower the probability of a crash into the fall avoidance area. In the example of FIG. 7(b), the speed reaches the speed $v_2$ after an aircraft flies beyond $A_1$. However, the speed may be set so as to reach the speed $v_2$ before the aircraft reaches the position $A_1$.

However, the setting example of the flight speed described above is merely an example. The flight speed may be set in any way as long as the flight speed is controlled based on a positional relationship between a current position grasped in real time on map information and a fall avoidance area. The control of the flight speed is not limited to the case where the speed is increased as an aircraft approaches the fall avoidance area. The speed may be temporarily reduced and then increased, or any other speed changing pattern may be applied.

Figure 8:
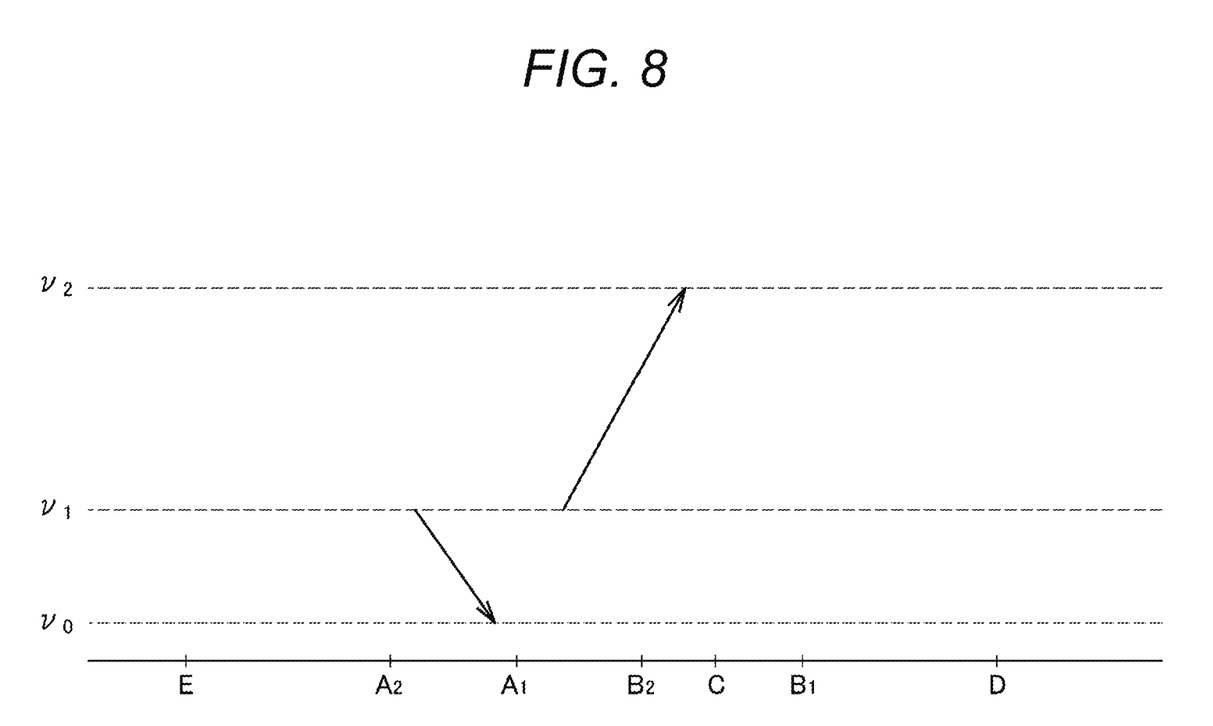
FIG. 8 is a diagram for explaining an example of performing acceleration or deceleration based on whether or not a current position of an unmanned aircraft is in front of a critical flight start point $A_1$.

Incidentally, in the present invention, as illustrated in FIG. 8, control may be performed such that deceleration is performed in a case where a current position of the unmanned aircraft 1 flying at the flight speed $v_1$ is in front of the critical flight start point $A_1$, and acceleration is performed in a case where the current position is beyond the critical flight start point $A_1$. By reducing the speed in a case where the unmanned aircraft 1 is in front of the critical flight start point $A_1$, it is possible to increase a probability that the unmanned aircraft 1 can fall in front of the starting end C of the fall avoidance area in a case where the unmanned aircraft 1 crashes due to sudden malfunction. In addition, by increasing the speed in a case where the current position is behind the critical flight start point $A_1$, it is possible to increase a probability that the unmanned aircraft 1 falls beyond the terminal end D of the fall avoidance area in a case where the unmanned aircraft 1 crashes due to sudden malfunction.

In addition, control may be performed such that an altitude is lowered in a case where the unmanned aircraft 1 is in front of the critical flight start point $A_1$, and the altitude is raised in a case where the current position is beyond the critical flight start point $A_1$. By lowering the altitude in a case where the unmanned aircraft 1 is in front of the critical flight start point $A_1$, it is possible to increase a probability that the unmanned aircraft 1 can fall in front of the starting end C of the fall avoidance area in a case where the unmanned aircraft 1 crashes due to sudden malfunction. Particularly in a case where the unmanned aircraft 1 is considerably in front of the critical flight start point $A_1$ and flying at an altitude higher than usual, by lowering the flight altitude, a probability of a crash into the fall avoidance area can be more effectively lowered. In addition, by increasing the altitude in a case where the current position is beyond the critical flight start point $A_1$, it is possible to increase a probability that the unmanned aircraft 1 can fall beyond the terminal end D of the fall avoidance area in a case where the unmanned aircraft 1 crashes due to sudden malfunction. However, it is often difficult to raise the flight altitude extremely, and therefore such control is not indispensable.

Figure 9:
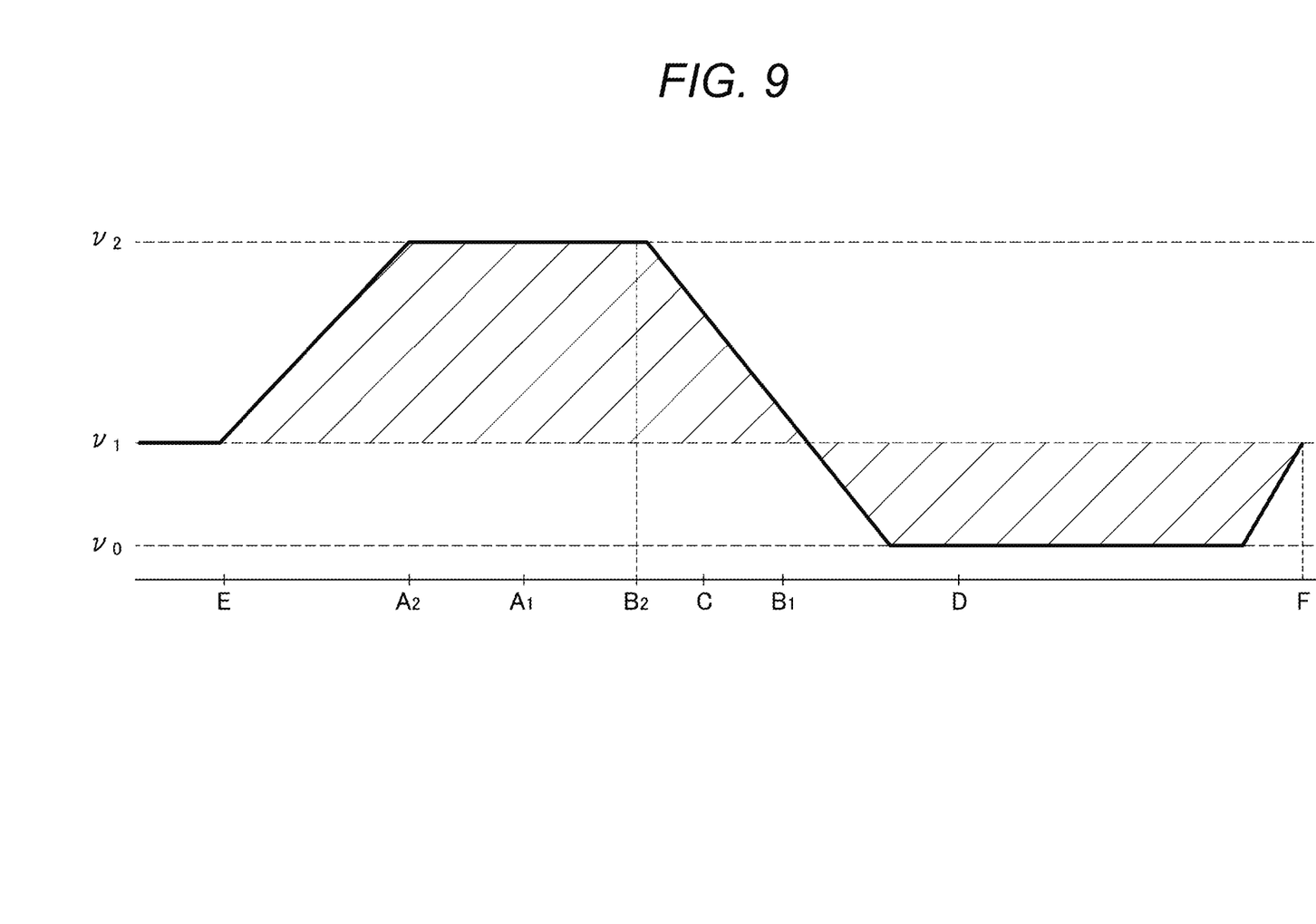
FIG. 9 is a diagram illustrating an example of reducing a speed from a speed $v_2$ to a speed $v_1$ and then further reducing the speed to a speed $v_0$ lower than the speed $v_1$.

Incidentally, as illustrated in FIG. 9, the speed may be reduced from the speed $v_2$ to the speed $v_1$, and then may be further reduced to $v_0$ lower than $v_1$. As a result, it is possible to adjust a distance by which the unmanned aircraft 1 has advanced too far by raising the speed to the speed $v_2$ as compared with the case of flying at a constant speed of the speed $v_1$. That is, by reducing the speed to the speed $v_0$, the speed of the unmanned aircraft 1 may be reduced, and the speed may be returned to $v_1$ such that the unmanned aircraft 1 arrives simultaneously with a case of flying constantly at the speed $v_1$ at the time of reaching the point F.

Note that the present invention is not limited to the case where the present invention is embodied as the above-described unmanned aircraft 1 but only needs to be embodied as a program for executing the unmanned aircraft 1.

REFERENCE SIGNS LIST

1 Unmanned aircraft
2 Operating terminal
7 Wireless communication unit
11 Rotor
12 Rotor motor
13 Motor stay
14 Battery
15 Control unit
16 First central plate
17 Second central plate
18 Third central plate
20 Installation tool
26 Leg portion
7 Placement arm
28 Skid
50 Flight controller
51 Wireless communication unit
52 Electric gimbal
53 Camera
55 Flight control sensor group
56 GNSS receiver
57 Control section
111 CPU
112 Memory
113 Controller
FIG. 2
2: OPERATING TERMINAL
7: WIRELESS COMMUNICATION UNIT
6: USER I/F
15: CONTROL UNIT
51: WIRELESS COMMUNICATION UNIT
52: ELECTRIC GIMBAL
53: CAMERA
50: FLIGHT CONTROLLER
57: CONTROL SECTION
112: MEMORY
113: PWM CONTROLLER
55: FLIGHT CONTROL SENSOR GROUP
56: GPS RECEIVER
14: BATTERY
12: ROTOR MOTOR
FIG. 3(b)
FALL AVOIDANCE AREA
FIG. 4
FLIGHT ROUTE
FALL AVOIDANCE AREA
FIG. 5
FLIGHT ALTITUDE h
GROUND
IN FRONT OF FALL AVOIDANCE AREA
FALL AVOIDANCE AREA
BEYOND FALL AVOIDANCE AREA

The invention claimed is:

1. An unmanned aircraft comprising:
a hardware processor which, under control of a stored program, is configured to control execution of processes comprising:
a flight route setting process for setting a flight route on map information including a fall avoidance area;
a flight control process for performing control such that the aircraft flies on a flight route set in the flight route setting process; and
a position information acquiring process for acquiring information at each position during flight on the flight route in relation to the map information in real time to determine whether or not the aircraft is approaching the fall avoidance area,
wherein in a case where it is determined in the position information acquiring process that the aircraft is approaching the fall avoidance area, the flight control process performs control so as to increase a flight speed, and an acceleration start position and an acceleration for increasing the flight speed are determined based on a positional relationship between information at each position acquired in the position information acquiring process and the fall avoidance area, a flight altitude, and a current flight speed.

2. An unmanned aircraft comprising:
a hardware processor which, under control of a stored program, is configured to control execution of processes comprising:
a flight route setting process for setting a flight route on map information including a fall avoidance area;
a flight control process for performing control such that the aircraft flies on a flight route set in the flight route setting process;
a flight altitude detecting process for detecting a flight altitude during flight on the flight route;
a flight speed detecting process for detecting a flight speed; and
a position information acquiring process for acquiring information at each position during flight on the flight route in relation to the map information in real time to determine whether or not the aircraft is approaching the fall avoidance area,
wherein:
the flight control process performs control so as to increase the flight speed in a case where it is determined in the position information acquiring process that the aircraft is approaching the fall avoidance area, and
the flight control process calculates a falling time based on a flight altitude detected in the flight altitude detecting process, specifies a critical flight end point where an estimated falling position determined from the calculated falling time and the increased flight speed is located on a terminal end of the fall avoidance area, and causes the aircraft to fly at least to a position beyond the specified critical flight end point at the increased flight speed or higher.

3. The unmanned aircraft according to claim 2, wherein the flight control process determines a deceleration point at which a reduction in flight speed is started based on the critical flight end point.

4. The unmanned aircraft according to claim 3, wherein the flight control process reduces the flight speed to a speed lower than a flight speed before the flight speed is increased.

5. An unmanned aircraft comprising:
a hardware processor which, under control of a stored program, is configured to control execution of processes comprising:
   a flight route setting process for setting a flight route on map information including a fall avoidance area;
   a flight control process for performing control such that the aircraft flies on a flight route set in the flight route setting process;
   a flight altitude detecting process for detecting a flight altitude during flight on the flight route;
   a flight speed detecting process for detecting a flight speed; and
   a position information acquiring process for acquiring information at each position during flight on the flight route in relation to the map information in real time to determine whether or not the aircraft is approaching the fall avoidance area,
wherein:
the flight control process performs control so as to increase the flight speed in a case where it is determined in the position information acquiring process that the aircraft is approaching the fall avoidance area, and
the flight control process calculates a falling time based on a flight altitude detected in the flight altitude detecting process, specifies a critical flight start point where an estimated falling position determined from the calculated falling time and the increased flight speed is located on a starting end of the fall avoidance area, performs control so as to reduce a speed in a case where a current position acquired in the position information acquiring process is in front of the critical flight start point, and performs control so as to increase the speed in a case where the current position is behind the critical flight start point.

6. An unmanned aircraft comprising:
a hardware processor which, under control of a stored program, is configured to control execution of processes comprising:
   a flight route setting process for setting a flight route on map information including a fall avoidance area;
   a flight control process for performing control such that the aircraft flies on a flight route set in the flight route setting process;
   a flight altitude detecting process for detecting a flight altitude during flight on the flight route;
   a flight speed detecting process for detecting a flight speed; and
   a position information acquiring process for acquiring information at each position during flight on the flight route in relation to the map information in real time to determine whether or not the aircraft is approaching the fall avoidance area,
wherein:
the flight control process performs control so as to increase the flight speed in a case where it is determined in the position information acquiring process that the aircraft is approaching the fall avoidance area, and
the flight control process calculates a falling time based on a flight altitude detected in the flight altitude detecting process, specifies a critical flight start point where an estimated falling position determined from the calculated falling time and the increased flight speed is located on a starting end of the fall avoidance area, lowers a flight altitude in a case where a current position acquired in the position information acquiring process is in front of the critical flight start point, and raises the flight altitude in a case where the current position is behind the critical flight start point.

* * * * *